Jan. 2, 1934.  W. S. GURTON ET AL  1,941,682

FIFTH WHEEL CONNECTER FOR SEMITRAILERS

Filed Feb. 8, 1932

*Inventors.*
William S. Gurton.
Joseph Plint.
Herman Nyberg.

by H. J. S. Dennison
atty.

Patented Jan. 2, 1934

1,941,682

UNITED STATES PATENT OFFICE

1,941,682

FIFTH WHEEL CONNECTER FOR SEMITRAILERS

William S. Gurton, Joseph Plint, and Herman Nyberg, Kitchener, Ontario, Canada, assignors to Dominion Truck Equipment Co. Limited, Kitchener, Ontario, Canada Application February 8, 1932. Serial No. 591,568

9 Claims. (Cl. 280—33.1)

The principal objects of this invention are to provide a coupling device which will enable the operation of coupling a semi-trailer to a truck very simple and positive.

A further object is to relieve the actual connecting parts of the coupling from undue stress and shock in the bringing of the two vehicles together and further, to provide a means for coupling trucks and trailers which will relieve both truck and trailer, as well as the members of the coupling carrying the load, from impact shocks due to change of speed and uneven road conditions.

The principal features of the invention consist in the novel construction and arrangement of a spring-held buffer member to intercept the movement of the coupling members prior to their reaching their locked position, relieving the members of shock and maintaining constant spring pressure thereon to hold said members in close engaging contact, obviating any loose play or rattling.

Further features of importance consist in the novel construction and arrangement of the latching mechanism for securing the connecter members in their co-operative locked position.

In the drawing, Figure 1 is a plan view of the coupling member arranged upon the truck.

Figure 1:
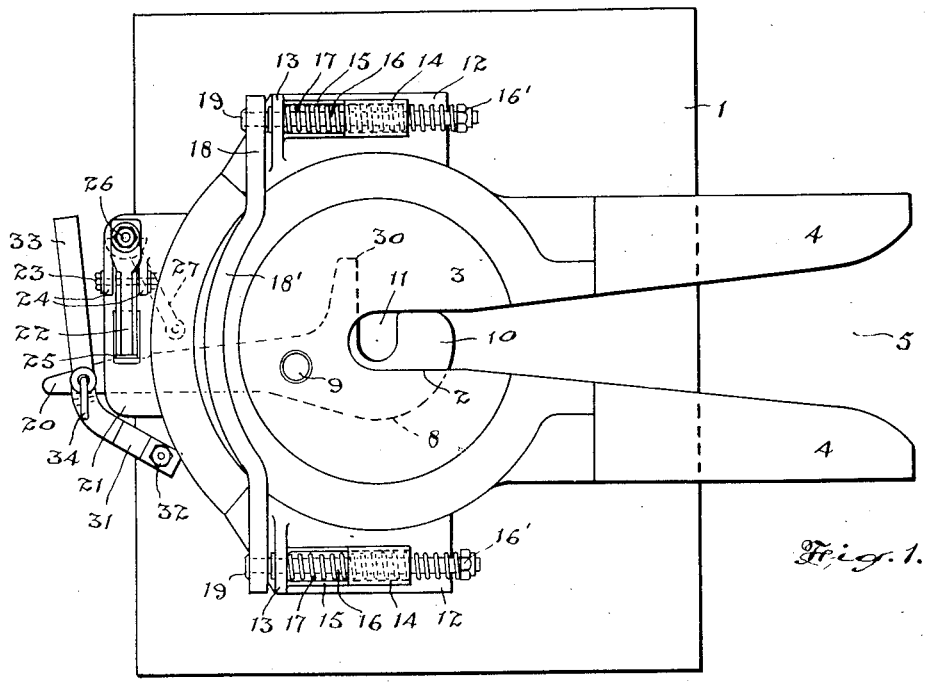
Figure 2:
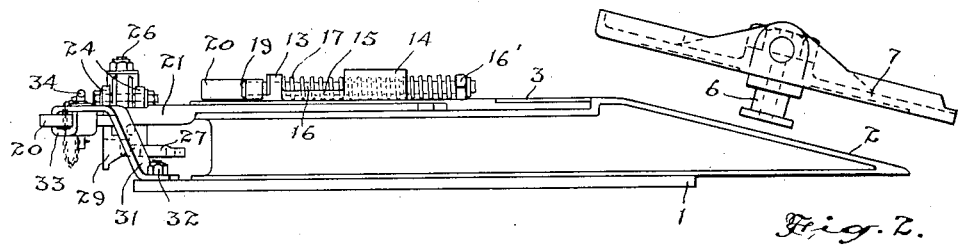
Figure 2 is a side elevational view of the coupling members shown in Figure 1 with the coupling member of the trailer arranged in a superposed position.
Figure 3:
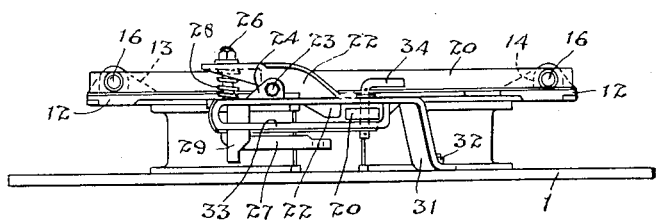
Figure 3 is a front elevational view of the coupling member shown in Figure 1.

In the construction of a truck adapted to transport vehicles of a semi-trailer type, the rear end of the truck is provided with a supporting member which carries the front end of the trailer and is connected thereto with a swivel connection and it is the particular purpose of this invention to enhance the value of this coupling element.

In the form of structure herein shown, the base plate 1 which is here shown of rectangular form, is secured to the truck platform and has secured to or formed as part thereof a raised guide-way 2 which is formed with a substantially circular flat top flange 3 and a pair of beveled guide arms 4 which are separated by a converging slot 5 which is adapted to engage and guide the flanged king pin 6 which is mounted in the circular plate 7 secured to the trailer member.

A hooked member 8 is pivotally mounted on the pin 9 so that the end portion 10 will swing across and close the inner end of the slot 5. The slot 11 of the hook which opens to one side is adapted to receive the channeled portion of the king pin 6 to hold it securely within the guideway 2 with the circle plate 7 resting in rotative contact on the top flange 3 of the guideway.

At either side of the top flange 3 of the guideway are arranged a pair of lateral horizontal flanges 12 from the upper surface of which extend the lugs 13 and to the rear of each of the lugs is arranged a guide 14, which guide is provided with a part cylindrical portion 15.

Bolts 16 are slidably mounted in horizontal orifices in the lugs 13 and coil compression springs 17 encircling the bolts 16 are housed in the guides 14 and 15. Nuts 16' are threaded on the outer end of the bolts by means of which the compression of the springs may be regulated.

The head ends 19 of the bolts extend beyond the lugs 13 and are rigidly secured in the ends of a bar 18, which extends across the guide and is provided with an arched central portion 18' which is adapted to conform to and fit against the circumference of the flange circle plate 7 of the trailer member. This cross bar is held by the springs 17 in a position to engage the periphery of the plate 7 as it moves inwardly into the guide considerably prior to the engagement of the king pin by the hook 8 and as the inward movement of the member 7 with its king pin continues, the springs 17 are compressed.

The device thus forms a spring buffer which relieves the shock of bringing the two coupling members together and when the truck element has been moved into position so that the hook 8 may engage and hold the king pin, a considerable compression pressure has been placed upon the plate 7 by the cross bar 18 and its co-operating springs. This pressure will, as will be readily appreciated, exert a continuous backward pressure on the king pin 6, holding it tightly against the hook upon which the actual pull of the load of the trailer is exerted. The spring pressure applied will prevent rattling of the coupling and also will eliminate undue thrust against the pin 9 upon which the hook is mounted.

The forward end 20 of the hook extends below the plate extension 21 of the member 1 and is engaged by a latch dog 22, which is mounted on a bolt 23 carried in the lugs 24 on the top of the plate extension, the end of the latch extending through a slot 25 in said plate extension.

A pin 26 provided with a laterally turned lower end 27 is mounted in the tail end of the latch 22 and is surrounded by a spring 28 which holds the latch in its locking position.

A bevelled lug or cam 29 is arranged on the underside of the plate extension 21 to engage the laterally turned end 27 of the pin 26 to draw downwardly on the vertical end of the pin when said pin is swung in its pivot and pulling against the pressure of the spring 28 it tilts the latch dog 22 to lift the end clear of the slot in the plate extension and release the hook end 20, so that the hook may be swung to the open position to allow the king pin to be withdrawn or inserted.

The hook is provided with a lug extension 30 at one side of the slot therein against which the king pin impinges in bringing the members together so that the hook is swung into its locked position automatically.

A bracket 31 secured to the base plate 1 by a bolt 32 is provided with a looped end 33 in which the forward end of the hook swings and a safety locking pin 34 is provided extending through the loop of the bracket and adapted to extend through a hole in the forward end of the hook. This provides a positive safety lock to ensure the maintenance of the lock when the truck is in transit.

The device is of extremely simple construction and of a very rugged nature. The bumper bar may be of any desirable cross section and the springs 17 will be of a desirable weight to absorb the shocks applied thereto so that when conditions of travel cause a tendency for the trailer to over-ride the truck the springs will relieve the forward impact and will hold the king pin normally in spring pressure contact with the king pin hook or other draft mechanism.

What we claim as our invention is:—

1. A fifth wheel connecter comprising the combination with a tractor having a mounting to receive the fifth wheel member of a trailer, of draft members mounted respectively on the tractor and trailer and forming a detachable draft connection, between said tractor and fifth wheel member, and cushioning means interposed between said tractor and trailer and co-operating with the respective draft members thereof to hold the same in positive pressure contact with each other.

2. A fifth wheel connecter comprising the combination with two wheeled transport units, of a base rigidly mounted with respect to one of said units and having a turning flange and a guideway thereto, a member carried by the other of said units adapted to engage the turning flange of the other unit, means forming a positive non-resilient draft connection between the latter member and said rigidly secured base, and cushioning means maintaining said draft means in positive pressure contact to prevent relative draft movement between the connected units.

3. The combination with a tractor and trailer to be connected of a fifth wheel connector comprising a base rigid with the tractor and having a turning flange and a guideway, a turning member carried by the trailer and adapted to enter said guideway and engage said turning flange, cushion means engaged and tensioned by said turning member in its entrance to said guideway to the turning flange whereby its final positioning is effected in opposition to said cushion means, and draft means for holding the turning member in its final position in pressure contact with said cushioning means, whereby said tensioned spring acts to hold said draft means in positive pressure contact with said turning member.

4. A fifth wheel connecter comprising a base having a turning flange and a guideway thereto, a flanged turning member adapted to enter said guideway, a spring buffer positioned above said turning base to be engaged and displaced by the outer flange periphery of said turning member on its entrance to engage the turning flange of said base, and means for locking said turning member to said base in pressure contact with said spring buffer.

5. A fifth wheel connecter, comprising a base having a turning flange and a guideway thereto, a bumper bar extending across said turning flange, compression springs mounted on said base and connected to each end of said bumper bar, a turning member adapted to rest upon said turning flange having a cylindrical periphery engaging said cross bar in pressure contact to displace the same in opposition to said compression springs, and mean for holding said turning member in constant pressure engagement with said cross bar.

6. A fifth wheel connecter comprising a base having a turning flange and a guideway thereto, a turning member adapted to engage said turning flange and having a king pin, a hook pivotally mounted on the base and adapted to engage said king pin to hold said turning member centrally in relation to said turning flange, resilient means for maintaining a pressure contact between said hook and king pin and automatically tensioned on the moving of said hook and king pin into coupling relation, and means for locking said hook.

7. A fifth wheel connecter comprising a base having a turning flange and a guideway thereto, a turning member adapted to engage said turning flange and having a king pin, a hook pivotally mounted on the base and adapted to engage said king pin to hold said turning member centrally in relation to said turning flange, said hook having a lever extension beyond its pivotal mounting, a pivotal latch, a spring co-operating with said latch to swing same into locking relation to said lever extension, and cam means co-operating with said latch to swing same in opposition to the spring out of locking relation to said lever extension.

8. A fifth wheel connecter comprising a base having a turning flange and a guideway thereto, lugs extending laterally either side of said turning flange, parallelly arranged guideways adjacent to said lugs, bolts slidable in said guides, compression springs encircling said bolts and retained in said guideways, a buffer bar rigidly secured to said bolts and extending across said turning flange, a circular member adapted to be secured to a vehicle and having a king pin, said king pin being adapted to enter the guideway and to direct the circular member to engage said turning flange, said turning flange being adapted to engage said buffer bar and to compress said springs, and means for locking the king pin in said guideway.

9. The combination with a tractor and trailer to be connected, of co-operative coupling members carried by the tractor and trailer respectively and disengageable the one with the other to uncouple the tractor and trailer, and spring means automatically tensioned on the coupling of said tractor and trailer and acting to urge the coupling members of the tractor and trailer respectively in opposite directions to hold said respective coupling members in positive draft contact with each other.

WILLIAM S. GURTON.
JOSEPH PLINT.
HERMAN NYBERG.